Sept. 25, 1928. 1,685,105
J. D. THOMPSON ET AL
MULTIUNIT TANK CAR
Filed July 1, 1927 4 Sheets-Sheet 3
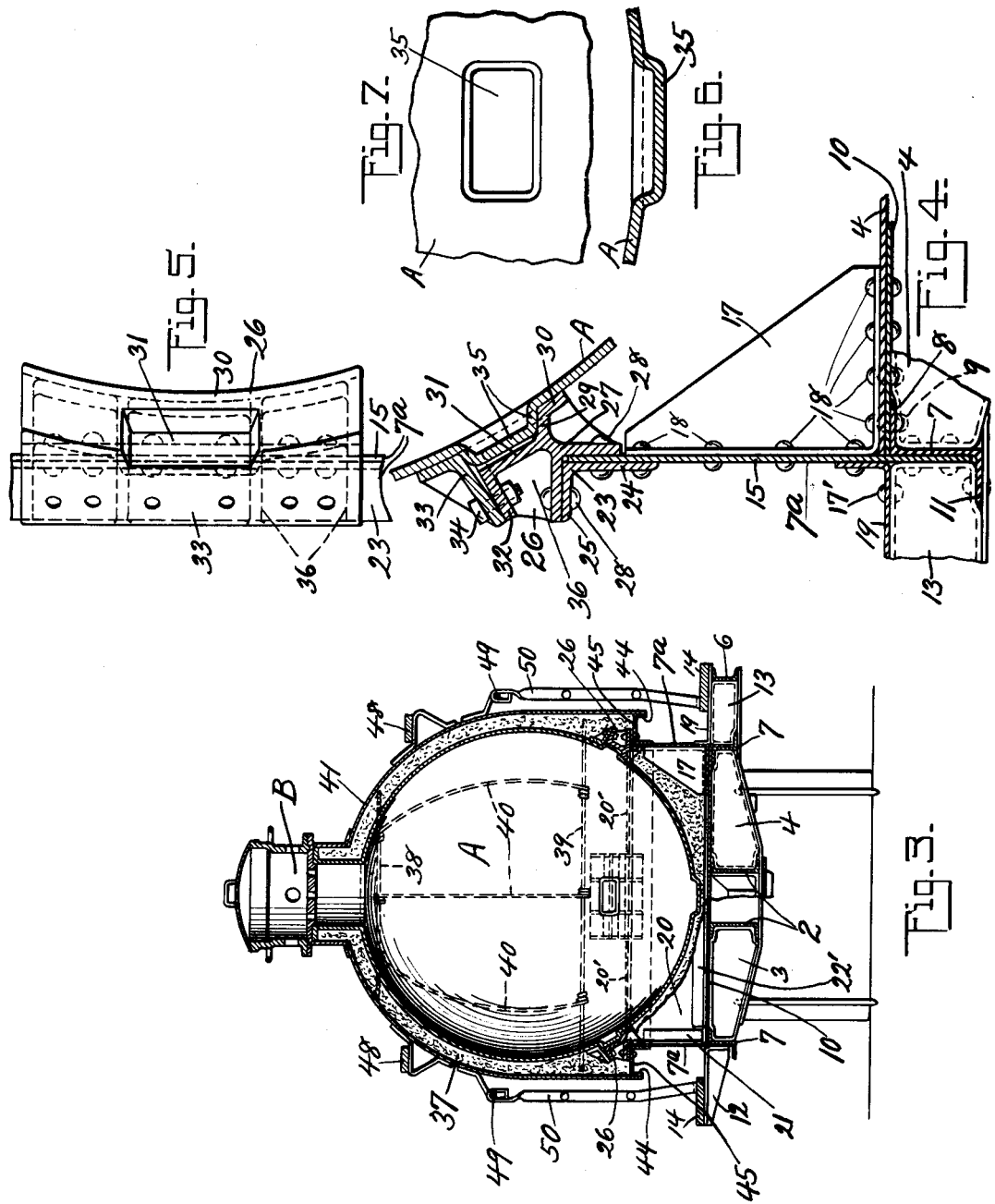
INVENTORS
John D. Thompson, and
Victor Willoughby
BY
ATTORNEY

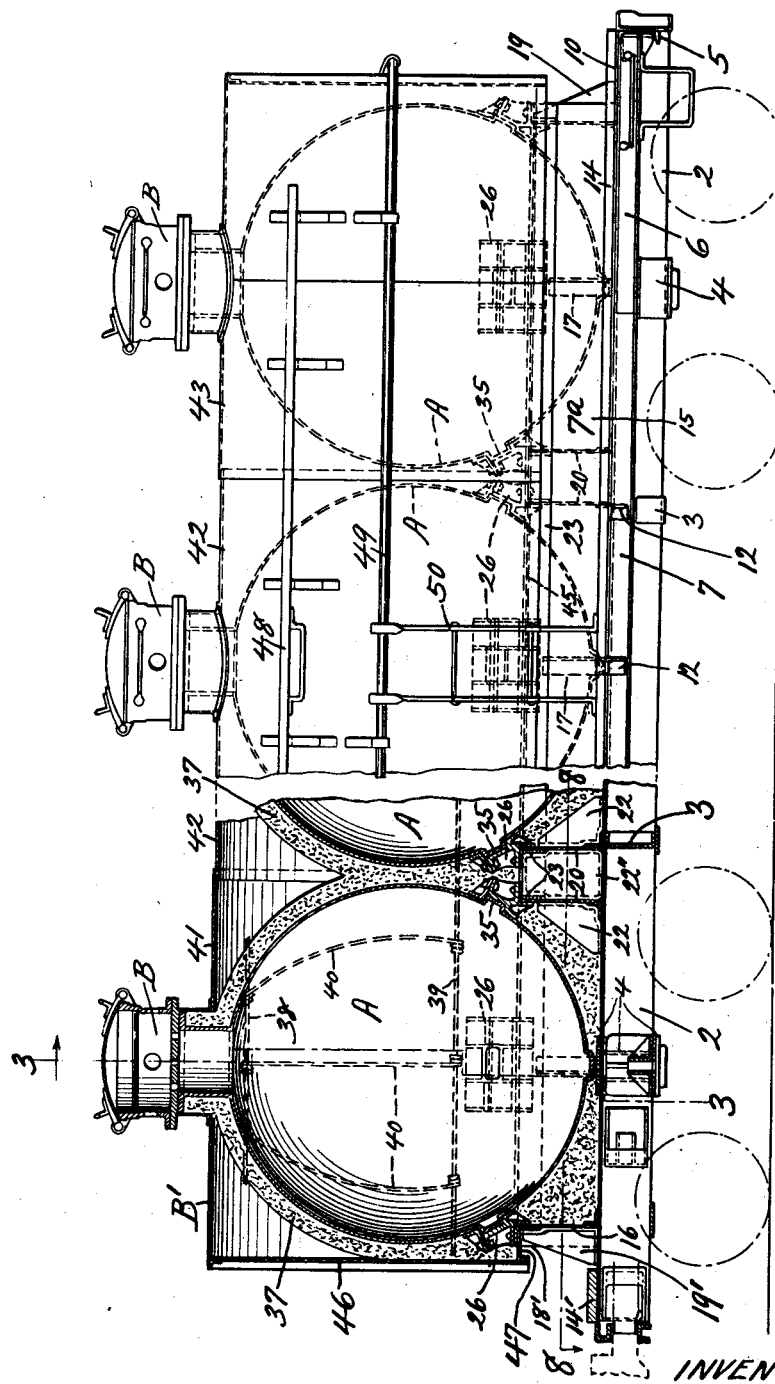

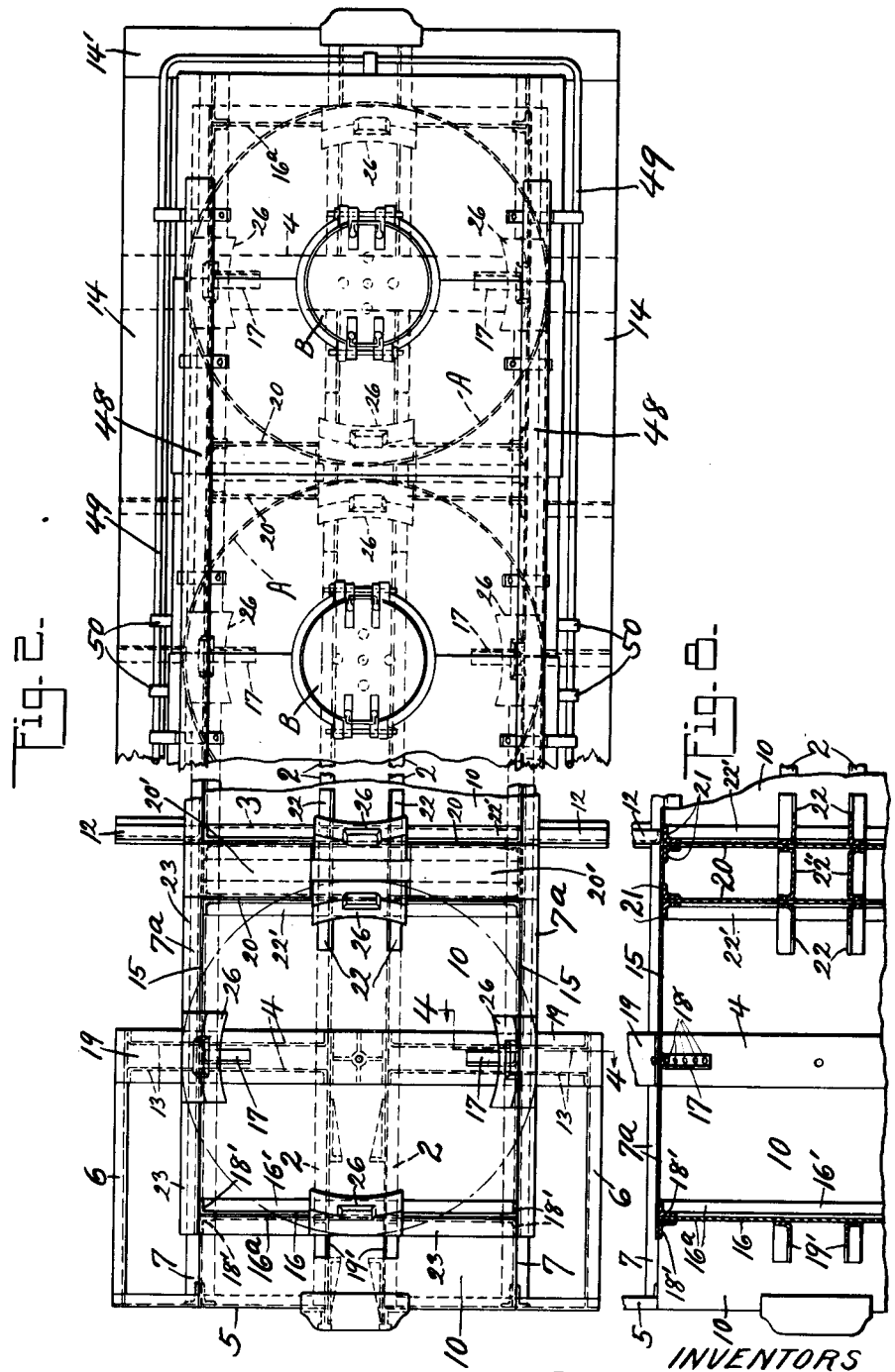

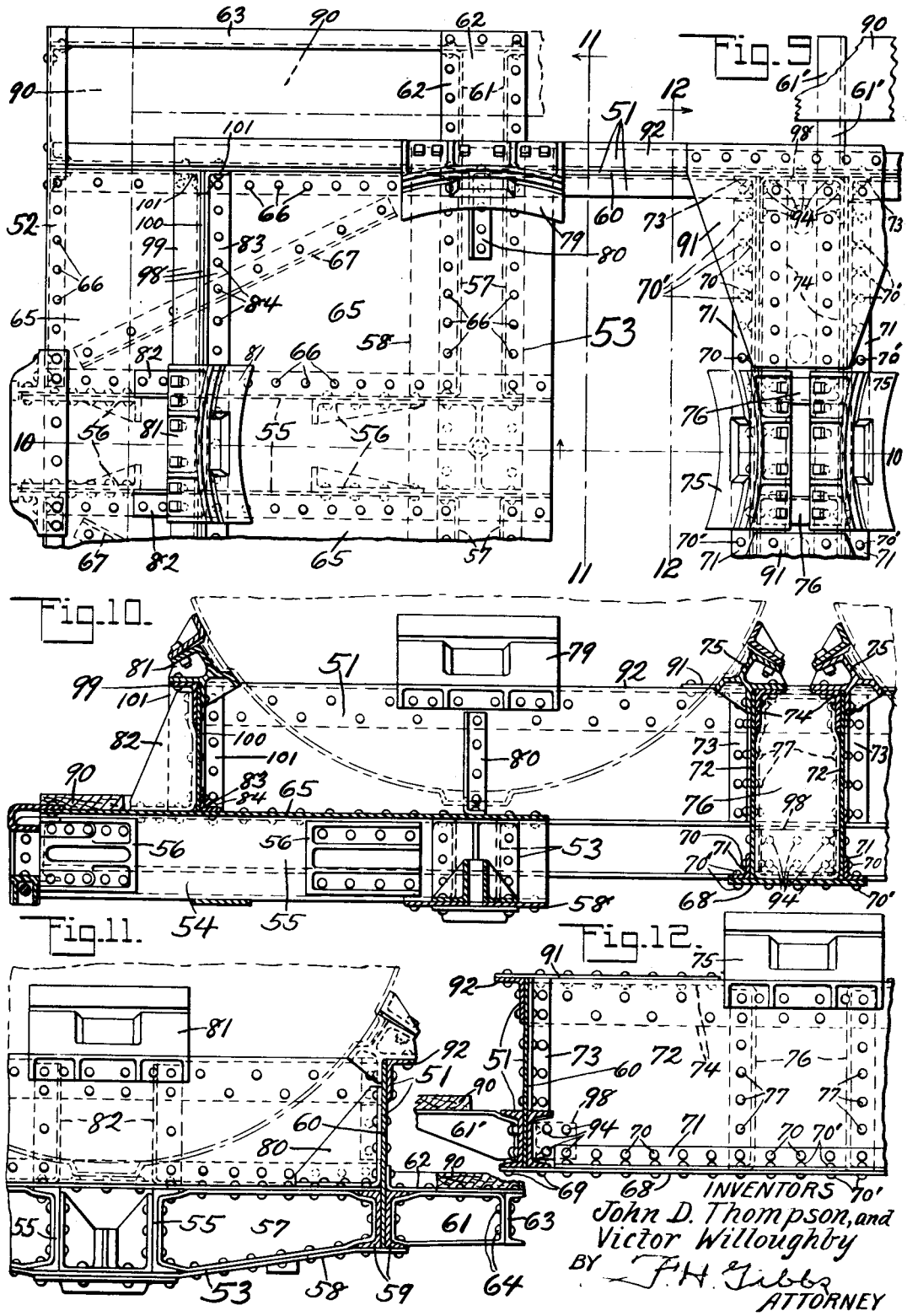

Patented Sept. 25, 1928.

1,685,105

UNITED STATES PATENT OFFICE.

JOHN D. THOMPSON, OF UNION CITY, AND VICTOR WILLOUGHBY, OF RIDGEWOOD, NEW JERSEY, ASSIGNORS TO AMERICAN CAR AND FOUNDRY COMPANY, OF NEW YORK, N. Y., A CORPORATION OF NEW JERSEY.

MULTIUNIT TANK CAR.

Application filed July 1, 1927. Serial No. 202,869.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side elevation, partly in section, of the car of the present invention;

Fig. 2 is a top plan view of the car of the present invention with certain parts thereof broken away to show the car frame;

Fig. 3 is a sectional view the right hand portion of which is on the line 3—3 of Fig. 1, and the left hand portion of which is taken just back of the bolster and partly broken away to show the construction at the cross bearer;

Fig. 4 is a sectional view on the line 4—4 of Fig. 2;

Fig. 5 is a detail view of one of the connections for the tanks;

Fig. 6 is a sectional view through a portion of one of the tanks showing the supporting ledge;

Fig. 7 is a plan view of the section of tank shown in Fig. 6;

Fig. 8 is a sectional view on the line 8—8 of Fig. 1;

Fig. 9 is a top plan view of a portion of a car frame showing a modified construction thereof;

Fig. 10 is a sectional view on the line 10—10 of Fig. 9;

Fig. 11 is a sectional view on the line 11—11 of Fig. 9; and

Fig. 12 is a sectional view on the line 12—12 of Fig. 9.

This invention relates to tank cars and has particular reference to tank cars carrying a plurality of tanks and commonly known in the art as multi-unit tank cars.

It is an object of the present invention to provide a tank car having insulated tanks all of which are retained to the car frame and within a suitable housing.

A further object of this invention is the provision of means for mounting the tanks securely in place under any and all conditions of service and yet to permit them to be readily removed from the car should occasion require.

Another object of the invention is to provide a supporting means for the tanks of a multi-unit tank car.

Still another object of the invention is to provide a multi-unit tank car in which a portion of each of the tanks will be positioned within the frame of the car.

Other objects and advantages of this invention will be apparent from the following description, taken in conjunction with the accompanying drawings, in which it can be seen that the car comprises an underframe formed of a center sill which may be, if desired, a box girder, but which in the instance shown comprises the spaced sills 2, and a plurality of cross bearers 3.

Bolsters 4 are provided near each end of the frame, and end sills 5 have their extended ends connected to the ends of the bolsters by braces 6. The car frame also includes side sills 7ª carried by the bolsters, and referring now to Figs. 3, 4 and 9, it can be seen that the side sills 7ª are in the main formed of web plates 15 having upper chords 23 formed of angles and lower chords 7 formed of Z-bars having the upper leg 8 thereof riveted as shown at 9 to the bolsters 4, including the upper flange of the bolster diaphragms and its cover plate 10 and, between bolsters, is connected to the intermediate cross bearers 3 and the lower leg 11 extending outwardly and supporting the running board brackets 12 and bolster extension 13, the whole forming a side of a tank supporting frame to be hereinafter described. As shown more clearly in Fig. 3, the bolster extensions and running board brackets support a running board 14.

The tank car of the present invention comprises a plurality of substantially spherical tanks A, each provided with a dome B, and the particular mounting for the tanks comprises essentially an open frame formed by side sills, girders and end members between the end sills and bolsters of the car thus providing a plurality of pockets or tank receiving areas into which the lower ends of the tanks are positioned; attaching means being carried by said frame for rigidly mounting the tanks.

Referring now to Figs. 2 and 8, the tank supporting frame comprises the side sills 7ª and end members designated generally as 16ª, the latter extending between the side sills and being connected to the latter at and above the cover plate 10 which is in effect a bolster cover plate and end platform extending to and secured to the end sills; gussets 17 being riveted as at 18 to said side sills and to cover plate 10 of the bolsters. A cover plate 19 is provided for the bolster extensions 13 and said plate 19 is also connected to the side sill webs 15 by suitable means such as the before-mentioned rivets 18 and by rivets 17'. The side sill webs 15 and their upper chords 23 do not extend the full length of the car but are cut short to provide a runway 14' at each end thereof, the lower chords of the side sills extending the full length of the car between end sills 5 and being fastened thereto as clearly shown in Figs. 2 and 8. The end members 16ª heretofore mentioned extend across the car frame and are connected to the side sills 7ª by angles 18'; gussets 19' being provided for reinforcing purposes, the latter being secured to the sills 2 (see Fig. 2).

The end members 16ª each include a plate 16 and I preferably secure to the lower edge thereof an angle 16' which is also fastened to the cover plate 10 by rivets (not shown) and which extends transversely of the car frame and between the side sills 7ª.

The car frame is also provided with spaced girders arranged transversely of the car and which comprise spaced web plates 20 rigidly connected to the side sills 7ª by opposed angles 21, lower chords 22' and top gussets 20'. For reinforcing purposes, the spaced plates 20 are provided with gussets 22 and diaphragms 22" secured to the sills 2. The girders are also preferably secured to the cover plate 10, cross bearers 3 and center sills 2 in any desired manner as by rivets (not shown). As clearly shown in Fig. 2, these girders are positioned immediately over the cross bearers and it will be apparent that these girders may be formed integral with or built up from the cross bearers within the spirit of the invention.

The construction just described, in effect, forms a plurality of pockets within which the lower ends of the individual tanks are received. The side and end web plates 15 and 16 are each provided with an angle or upper chord 23, one leg 24 of which is riveted to the web plates and the other leg 25 is outwardly extended as shown clearly in Fig. 4 to form a bearing for a supporting element 26, the latter comprising an angle base 27 riveted as shown at 28 to the side plate 15 and angle 23. This supporting element 26 is preferably a casting of the form shown in Fig. 4, and the base 27 is provided with an outwardly extended seat 29 and a depending flange 30 against which latter the side of the tank A is positioned. Extending upwardly and rearwardly from the seat 29 is a back 31, and an attaching flange 32 is formed on the upper edge of the back; said flange being arranged at substantially right angles to said back portion and being adapted to support an angular retaining or locking element 33 by means of a bolt 34. This retaining or locking element 33 has its forward end extended beyond the back 26 and provides a locking plate to retain the tank in position; the tank being provided with an outwardly formed ledge 35 adapted to rest on the seat 29 with its upper edge engaged by the element 33. For reinforcing purposes, the casting 26 is provided with the ribs 36.

For supporting each tank, four of these castings are provided, as more clearly indicated in Fig. 2, and they are arranged in diametrically opposed pairs. Fig. 2 clearly indicates the positioning of these castings, and it can be seen that each end member 16ª is provided with a casting 26, the side sills are provided with opposed pairs of castings, and the girders likewise each support castings. This invention therefore provides a frame having a plurality of tank receiving portions each provided with opposed pairs of attaching or supporting elements.

As before-mentioned, the tanks are preferably spherical in shape, and in the present instance, the tanks are each insulated as shown at 37. In practice, the insulation is usually of strip form which may be readily applied to the body of the tank as is well known in the art, and such insulation is retained in engagement with the tank by a suitable harness comprising upper and lower rings 38 and 39 and connecting members 40. The several tanks A are received within a housing B' formed of the telescoping sections 41, 42 and 43, and the lower edge of each of these sections is secured to the downwardly extending attaching flange 44 of an angle beam 45 connected to the side sill 7ª, as particularly shown in Fig. 3. End closures 46 are provided, the same being connected at their lower edge to the downturned flange of an angle beam 47. For convenience, a running board 48 is arranged on each side of the housing and extends longitudinally of the car, and hand rails 49 are also provided to which, and to the running boards 14, ladders 50 are attached for an obvious purpose.

Referring now to Figs. 9 to 12 inclusive which show a modified form of the invention, the car frame is shown as devoid of the usual center sill and comprises a frame having the side sills 51, the end sills 52 and the bolsters 53. The draft construction is indicated at 54 and comprises opposed channels 55 extending rearwardly to a point adjacent the bolster 53 and provided with the usual draft lugs 56. The bolster is of the type heretofore described and includes, as shown in Fig. 11, the diaphragms 57 extending outwardly on each side of the channels 55 to the side sills, and a bottom cover plate 58 extending under the channels 55 to the side sills. The side sills 51 of this modification each comprise a web plate 60 placed between opposed channels 59 which channels form a lower chord, and an angle shaped upper chord 92, the whole being riveted together as shown to form a unitary structure. The outer channel 59 supports diaphragms 61 forming running board brackets, having a cover plate 62 riveted thereto and to a longitudinally arranged channel 63 riveted to the ends of the bolsters as shown at 64 and extending forwardly to the extended ends of the end sills 52. Brackets 61' are also riveted to the lower chord of each side sill 59, and in conjunction with bolster extension 61 and end sill 52, form a support for running boards 90. Each end of this car frame is provided with a cover plate 65 which is riveted as shown at 66 to the side sills, the center sills and the bolster, and braces 67 are riveted or otherwise secured to this plate for reinforcing purposes.

The cross bearers shown in this modification form also the tank supports or girders, and referring to Figs. 10 and 12, the girders comprise spaced web plates 72 having angles 74 secured thereto to form the upper chord, angles 71 secured to their lower edges by rivets 70 to form the lower chord, and a bottom cover plate 68 fastened to said lower chord by rivets 70', and to the lower surfaces of the side sills 51 by rivets 69; said girders extending between the side sills 51 and being connected thereto by angles 73 riveted thereto and to the side sills. The web plates 72 are also secured at their lower corners by U-shaped connections 98 which are riveted thereto and to the side sills 59 by rivets 94 as clearly shown in Figs. 9 and 12. The upper chords 74 of said girders have gussets 91 secured thereto and to the upper chords 92 of the side sills 51 to form lateral braces. The upper chord 74 supports a casting 75, the latter being similar in all respects to the heretofore mentioned castings 26 and, like said castings 26, mounts a tank in a similar manner. Reinforcing diaphragms 76 are provided between the web plates 72 and they are secured thereto by rivets 77 or the like.

Other castings 79 are provided for the support of the tanks, and referring to Fig. 10, it can be seen that the side sills support such castings, adjacent the bolsters 53; gussets 80 being provided for reinforcing purposes, and the end members 98 also mount castings 81. Gussets 82 are provided as end member braces, and said end members 98 each comprise an upper chord 99, a web plate 100 and a lower chord 83, and the whole is riveted together to form a unit which is placed transversely of the car and is fastened to the side sills 59 by angle connections 101 riveted thereto and to the said sills. It is also fastened by its lower chord to the cover plate 65 by rivets 84. It is to be understood that the scheme outlined is carried forth throughout the entire length of the car; four castings being provided for the support of each tank in what might be termed the tank pockets, as heretofore described.

It is also to be understood that while the drawings disclose the adaptation of spherical tanks, the invention is not confined to the use of tanks of this particular design, but obviously, tanks of other shapes might be employed within the scope of the invention without departing from the spirit of the appended claims. For example, square tanks might be employed or cylindrical tanks might be used, said tanks being mounted either vertically or horizontally.

What is claimed is:

1. In a tank car, an underframe having side and center sills, cross bearers carried by the underframe and defining a plurality of tank receiving areas, supporting means carried by said side sills and cross bearers, and tanks in said tank receiving areas mounted on said supporting means.

2. In a tank car, an underframe having side and center sills, cross bearers carried by the underframe and definnig a plurality of tank receiving areas, supporting elements carried by said side sills and cross bearers, tanks in said tank receiving areas, and means carried by said tanks for engagement with said supporting elements for retaining the tanks in said areas.

3. In a tank car, an underframe having a center sill and side sills extended above the plane of the center sill, upwardly extending cross bearers carried by the center sill and providing with said side sills a plurality of tank receiving pockets, supporting elements mounted on said side sills and cross bearers, a tank in each of said pockets, and means formed in said tanks complemental with said supporting elements for engagement with the latter to support said tanks with their lower ends within the plane of the side sills.

4. In a tank car, an underframe having a center sill and side sills extended above the plane of the center sill, cross bearers carried by the underframe and extending upwardly with their upper edges substantially in line with the upper edges of the side sills, said cross bearers defining a plurality of tank receiving pockets, a tank in each of said pockets, complementary tank supporting means on the tanks, cross bearers and side sills, insulation surrounding each tank, and a housing covering all of said tanks.

5. In a tank car, an underframe having a center sill and side sills, upstanding webs forming a part of said side sills, cross bearers carried by the underframe and defining tank receiving recesses, tanks having their ends positioned in the recesses, supporting elements mounted on the side sills and cross bearers, ledges formed in the tanks and seated on the supporting elements to support said tanks, a lock plate detachably secured to the supporting elements for maintaining the tanks in position on said supports, insulation covering said tanks, and a housing for said tanks.

6. In a tank car, an underframe comprising a center sill, side sills extending upwardly above the plane of the center sill, and cross bearers connected to said side sills and defining with the latter a plurality of tank receiving areas.

7. In a multi-unit tank car, an underframe, a plurality of tank receiving pockets formed in the underframe, a substantially spherical tank in each pocket, with its lower end within the plane of the underframe side sills, insulation for each tank and a housing covering all of said tanks.

8. In a multi-unit tank car, an underframe having upwardly extending side sills and cross bearers providing a plurality of tank receiving pockets, an insulated tank secured at its lower end within each pocket, a housing for said tanks, and running boards secured to said housing.

9. In a multi-unit tank car, an underframe having side sills each provided with an upstanding web, cross bearers connecting said webs and comprising spaced webs having reinforcing gussets, said webs and side sills providing a plurality of tank receiving pockets, supporting elements secured to the upper edges of said side sill webs and the cross bearers, tanks positioned in the recesses, ledges formed in the tanks and adapted to rest on the supporting elements to position said tanks with their lower ends within the aforesaid pockets, and lock elements secured to the supporting elements for retaining the tanks on their seats.

10. A multi-unit tank car comprising an open underframe having side sills each provided with an upstanding web, a plurality of pairs of spaced webs extending transversely of the underframe secured to the side sill webs and providing cross bearers, opposed brackets secured to each pair of spaced webs, brackets secured to said side sills in opposed relation, a plurality of tanks supported by the brackets, a locking plate detachably secured to each bracket and engaging the tank supported thereby, an insulating covering for each tank, and a housing for all of said tanks secured to the underframe.

11. In a tank car, an underframe having side sills, cross bearers connecting said side sills, a plurality of opposed pairs of brackets mounted on the side sills, a plurality of opposed pairs of brackets mounted on the cross bearers, tanks each having ledges formed therein and adapted to seat on the brackets, a locking plate detachably secured to each bracket for retaining the tanks in position on the brackets, insulation secured to the tanks, and a housing covering said tanks and secured to the side sills.

12. In a tank car, an underframe having bolsters and side sills, an upstanding web plate secured to said side sills and extending from a point adjacent one end of the car to a point adjacent the opposite end, a plurality of opposed pairs of brackets secured to said web plates, a plurality of pairs of spaced cross bearers connected to said web plates and defining with the latter a plurality of tank receiving areas, brackets mounted on said cross bearers, a tank in each area, and complementary means formed in each tank for engaging the brackets to support the tanks.

13. A multi-unit tank car comprising an underframe having a plurality of pairs of spaced webs extending transversely thereof, a web extending transversely of the frame adjacent each end thereof, brackets secured to the aforesaid webs, a plurality of spherical tanks, means formed on each tank adapted to rest on said brackets for supporting the tanks with the ends thereof below the plane of the upper edges of said webs, insulation surrounding each of the tanks, and a housing covering said tanks.

14. A multi-unit tank car comprising an underframe having upwardly extending sides, a plurality of pairs of spaced webs extending transversely of the body and connected to the sides, a transversely arranged web adjacent each end of the underframe, opposed pairs of supporting elements connected to said webs and underframe sides, upright spherical tanks supported by said supporting elements, with the lower ends thereof below the plane of the upper edges of the webs and sides, insulation secured to each tank, and a housing covering all of said tanks and connected to said underframe.

15. In a multi-unit tank car having an underframe provided with side sills and cross bearers, means for supporting tanks comprising opposed pairs of brackets secured to the side sills and cross bearers, means on the tanks adapted to rest on the brackets, and a locking plate detachably connected to each bracket and engaging the tank for retaining the tanks in position on the brackets.

In witness whereof we have hereunto set our hands.

JOHN D. THOMPSON.
VICTOR WILLOUGHBY.